(12) United States Patent
Kashima et al.

(10) Patent No.: US 10,349,647 B2
(45) Date of Patent: Jul. 16, 2019

(54) THREE-DIMENSIONAL STRUCTURE CONTAINING VOLATILE CHEMICAL

(71) Applicant: DAINIHON JOCHUGIKU CO., LTD., Osaka (JP)

(72) Inventors: Seiichi Kashima, Osaka (JP); Tomohiro Kakinoki, Osaka (JP); Yumi Kawajiri, Osaka (JP); Koji Nakayama, Osaka (JP); Masuo Matsumoto, Osaka (JP)

(73) Assignee: DAINIHON JOCHUGIKU CO., LTD., Osaka (JP)

( * ) Notice: Subject to any disclaimer, the term of this patent is extended or adjusted under 35 U.S.C. 154(b) by 0 days.

(21) Appl. No.: 15/332,124

(22) Filed: Oct. 24, 2016

(65) Prior Publication Data

US 2018/0110211 A1 Apr. 26, 2018

(51) Int. Cl.
| | |
|---|---|
| *B32B 3/10* | (2006.01) |
| *A01M 1/20* | (2006.01) |
| *A01M 29/12* | (2011.01) |
| *A01M 1/24* | (2006.01) |

(52) U.S. Cl.
CPC ............ *A01M 1/2044* (2013.01); *A01M 1/24* (2013.01); *A01M 29/12* (2013.01)

(58) Field of Classification Search
CPC .. A01M 1/2044; A01M 1/2055; A01M 29/12; A01M 1/24; A01N 25/34; B01J 19/30; B01J 19/305; A01G 9/025; A01G 9/106
See application file for complete search history.

(56) References Cited

U.S. PATENT DOCUMENTS

| | | | | |
|---|---|---|---|---|
| 4,802,626 A | * | 2/1989 | Forbes | A01M 1/02 239/36 |
| D365,392 S | * | 12/1995 | VanGundy | D22/122 |
| 5,820,791 A | * | 10/1998 | Canale | A61L 9/042 239/54 |
| 8,367,011 B2 | * | 2/2013 | Yamamoto | A01M 1/2033 239/53 |
| 2015/0272109 A1 | * | 10/2015 | Davis | A01M 29/12 43/131 |

FOREIGN PATENT DOCUMENTS

| | | | | |
|---|---|---|---|---|
| JP | 2006-314284 | | 11/2006 | |
| JP | 2016-123389 | | 7/2016 | |
| WO | WO 2009078131 A1 | * | 6/2009 | ............ A01G 9/1066 |
| WO | WO-2013073571 A1 | * | 5/2013 | ............ A01M 29/12 |

OTHER PUBLICATIONS

Machine translation of WO 2013/073571 (Year: 2013).*

* cited by examiner

*Primary Examiner* — Maria V Ewald
*Assistant Examiner* — Zachary M Davis
(74) *Attorney, Agent, or Firm* — Wenderoth, Lind Ponack, L.L.P.

(57) ABSTRACT

A three-dimensional structure is provided which is obtained by molding a volatile chemical-containing resin composition into a plate form, wherein the three-dimensional structure includes through-holes penetrating therethrough from the front to the back thereof, the through-holes have peripheries having a shape selected from polygonal, circular, circular arc and spiral shapes when the three-dimensional structure is viewed from the front, and the peripheries of the through-holes are formed on a single plane or on a smoothly curved imaginary surface.

4 Claims, 15 Drawing Sheets

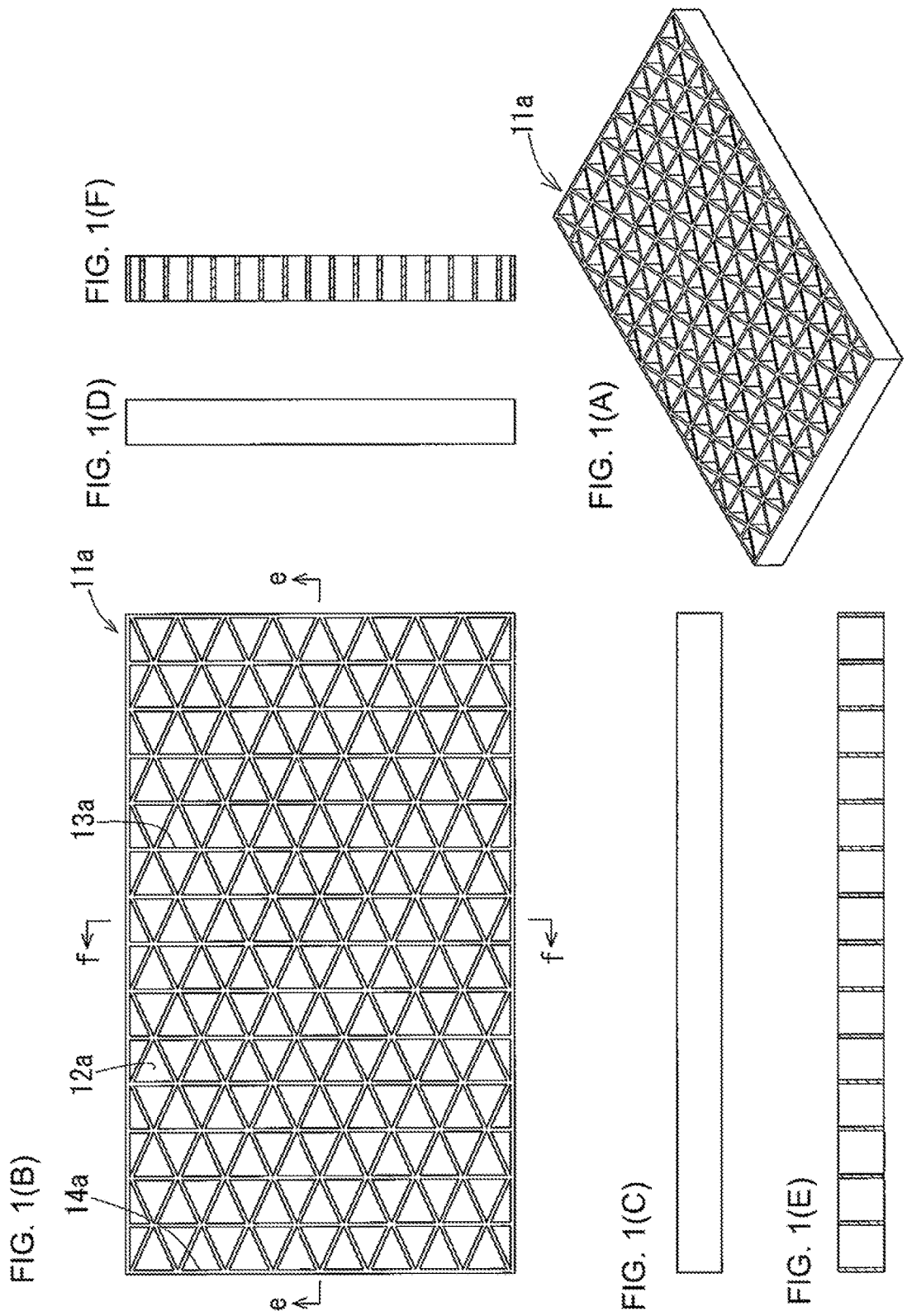

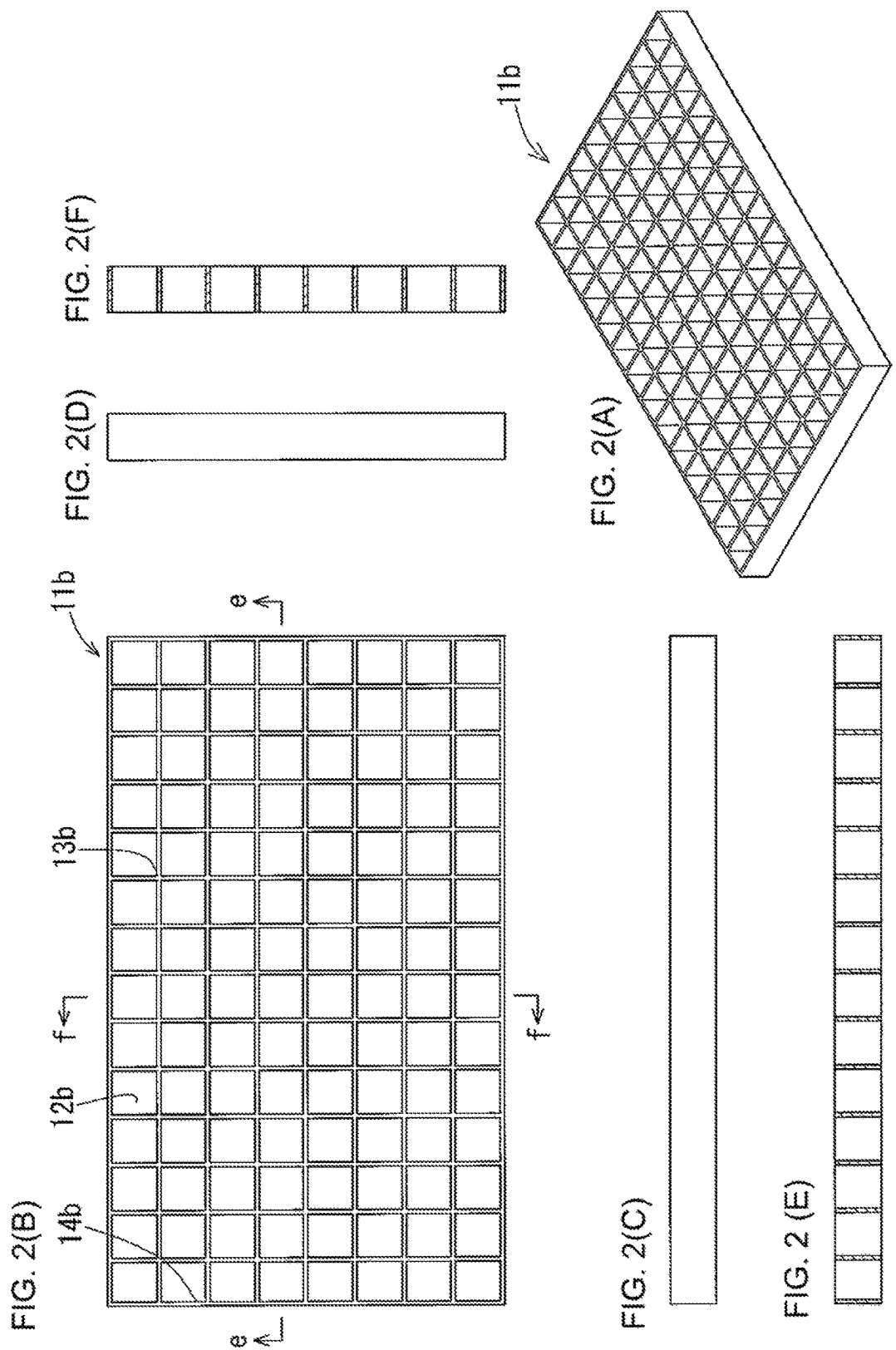

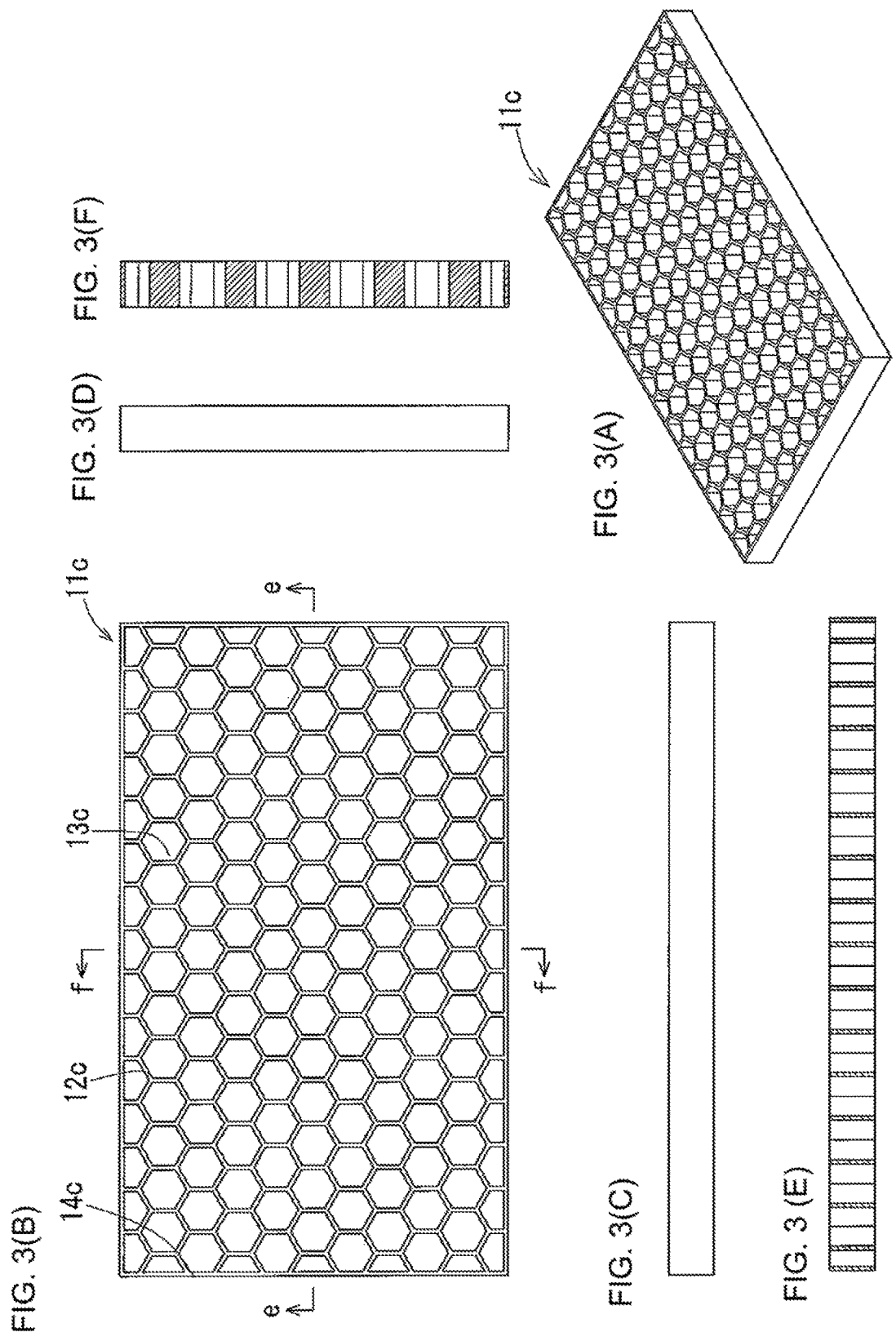

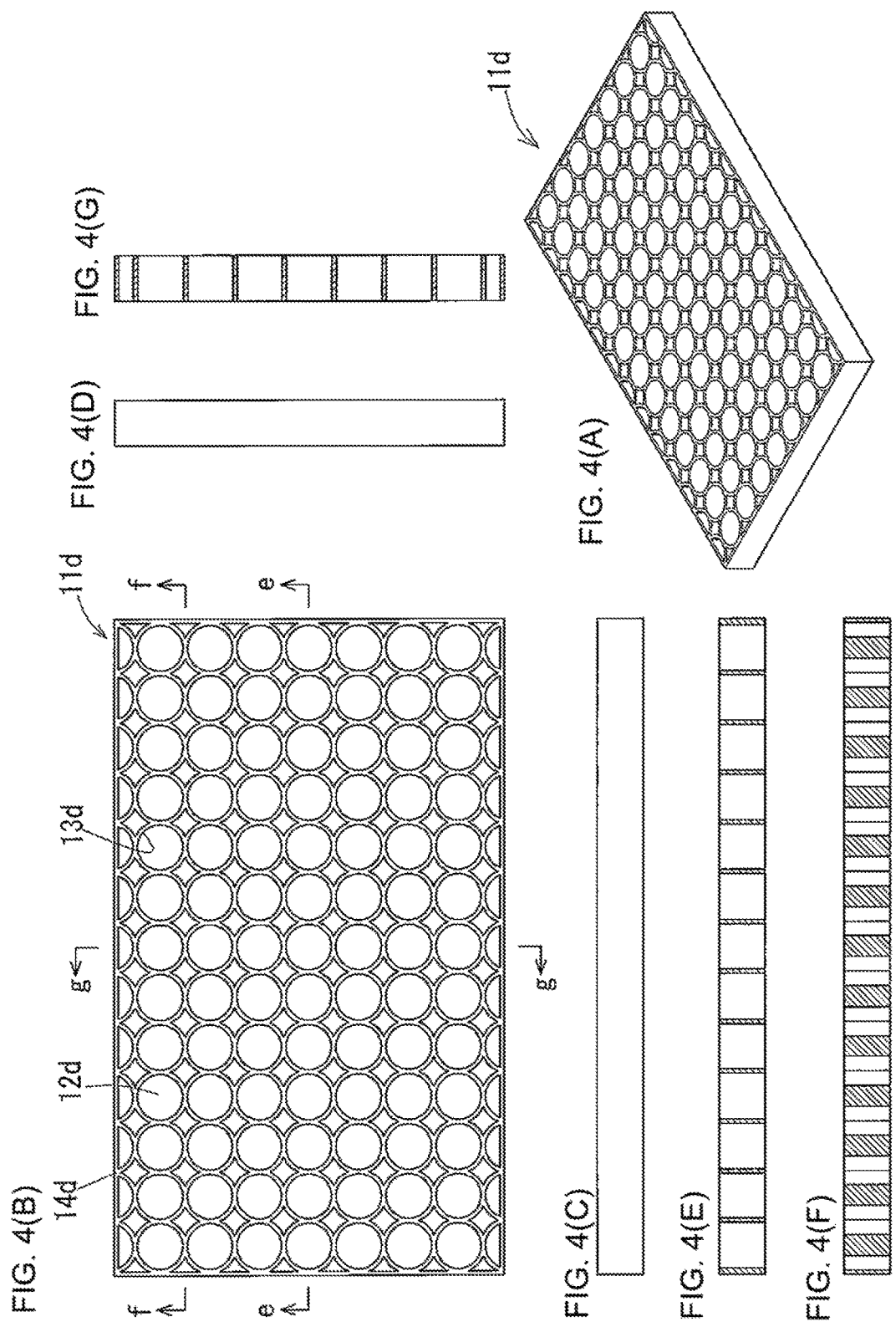

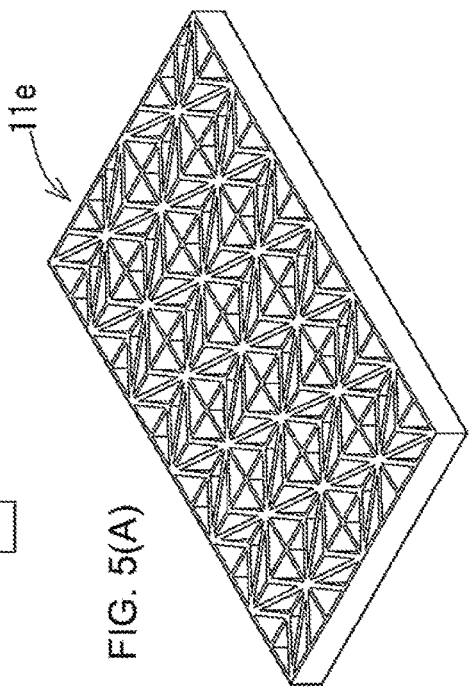
FIG. 5(A)
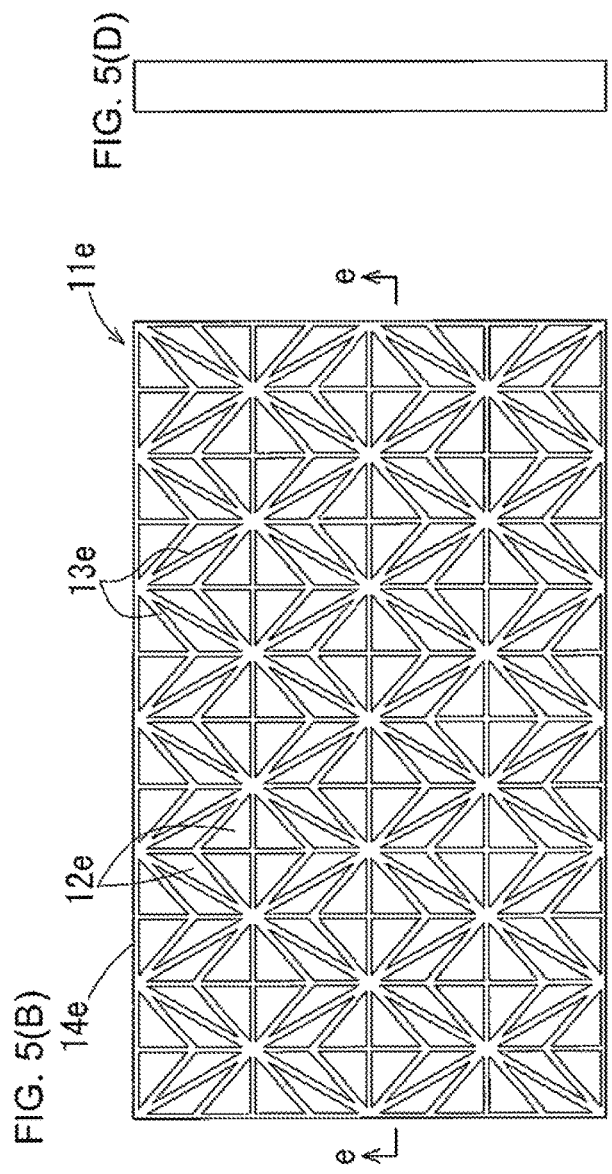
FIG. 5(B)
FIG. 5(C)
FIG. 5(D)
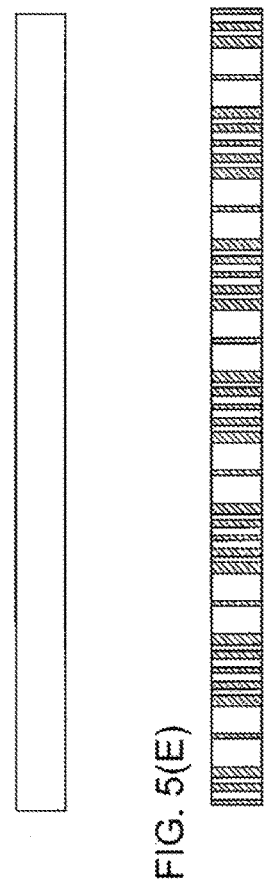
FIG. 5(E)

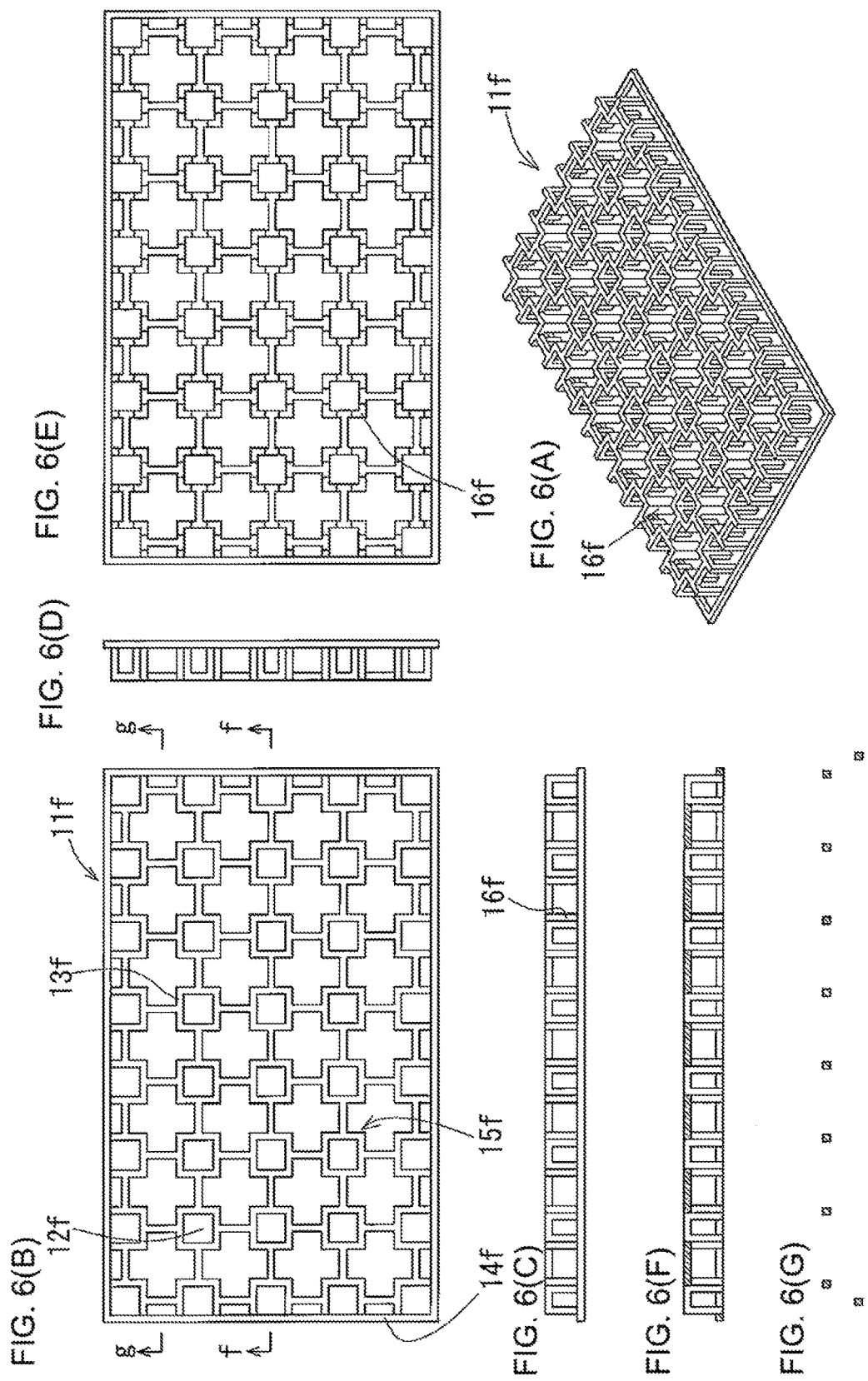

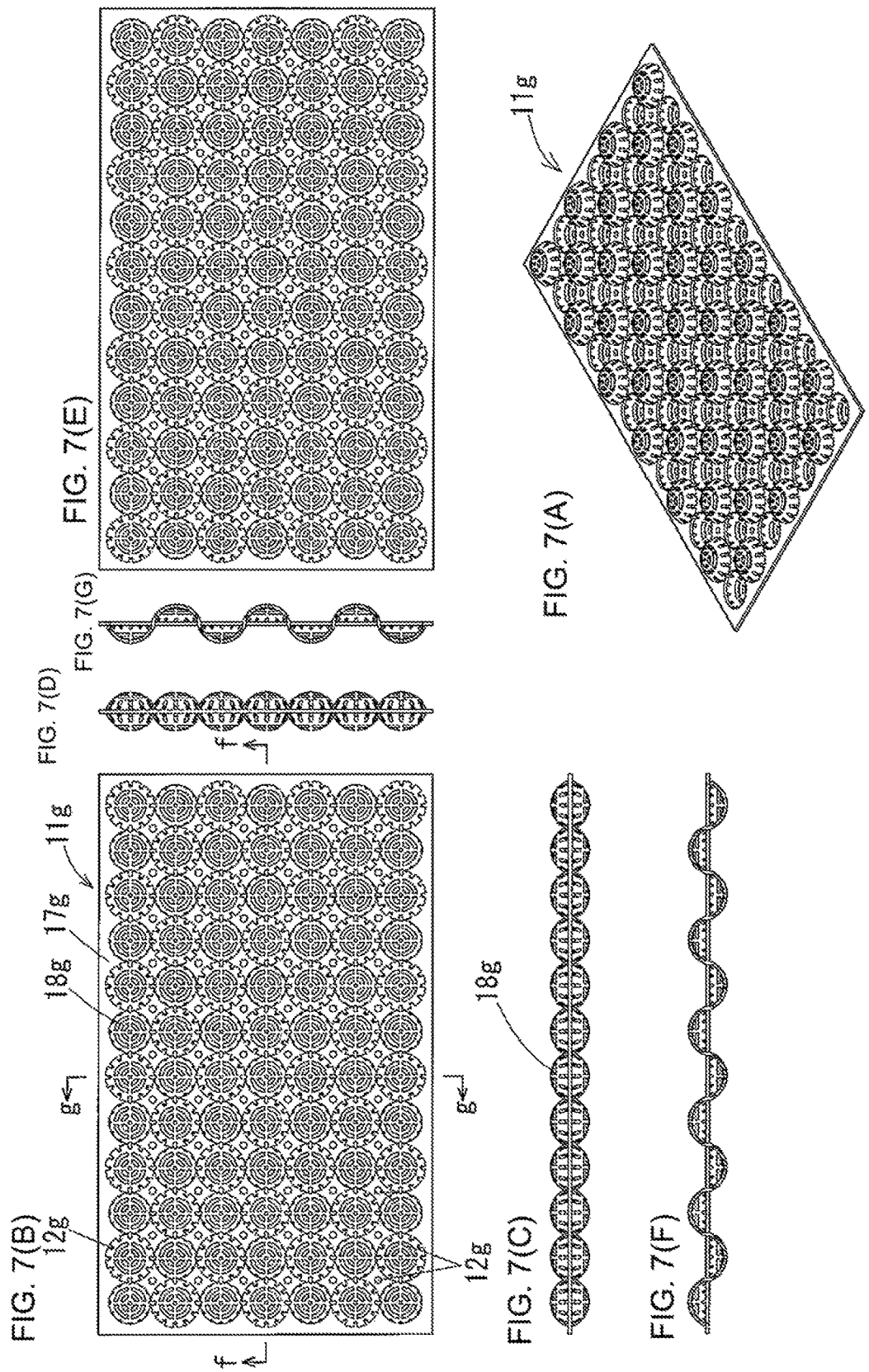

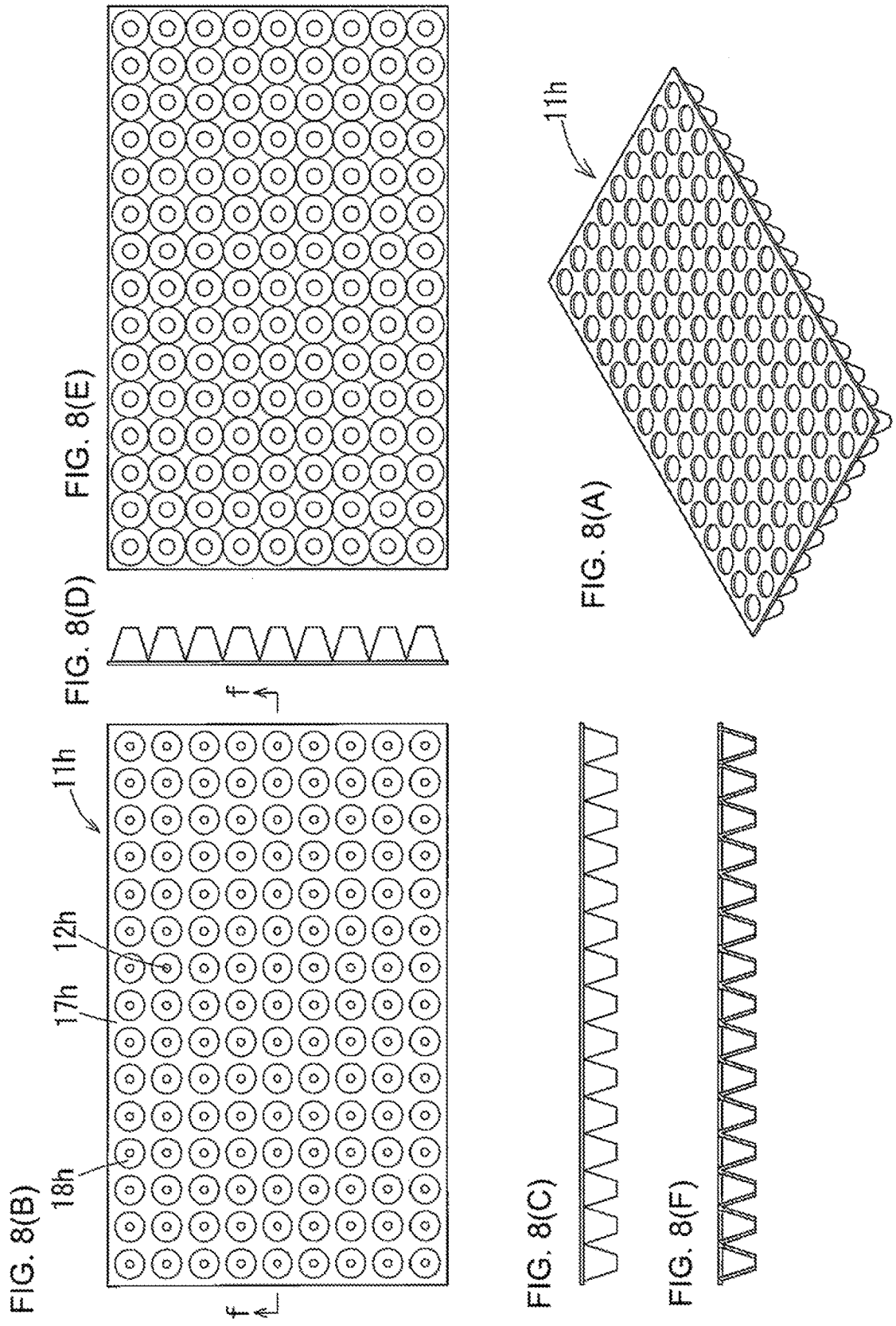

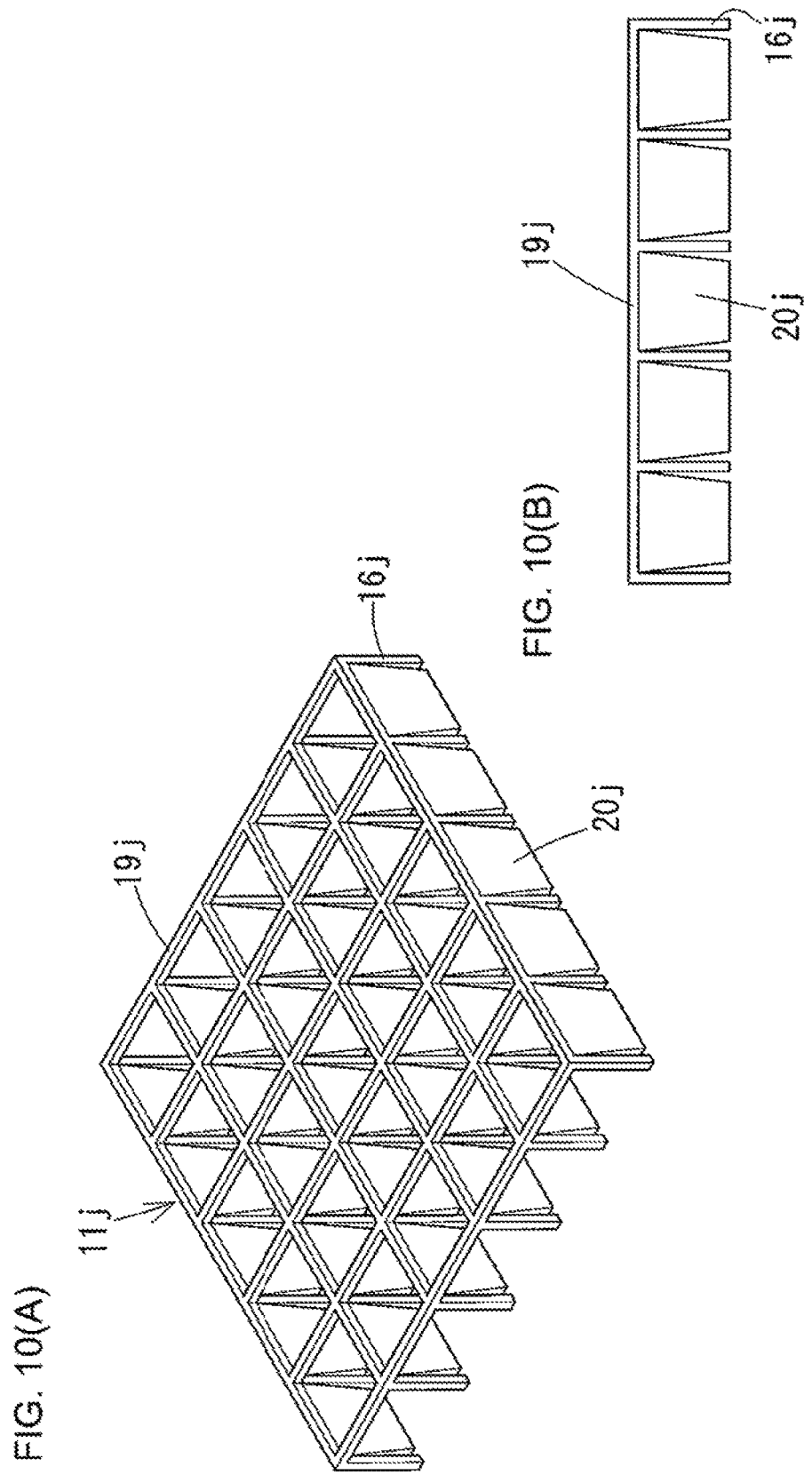

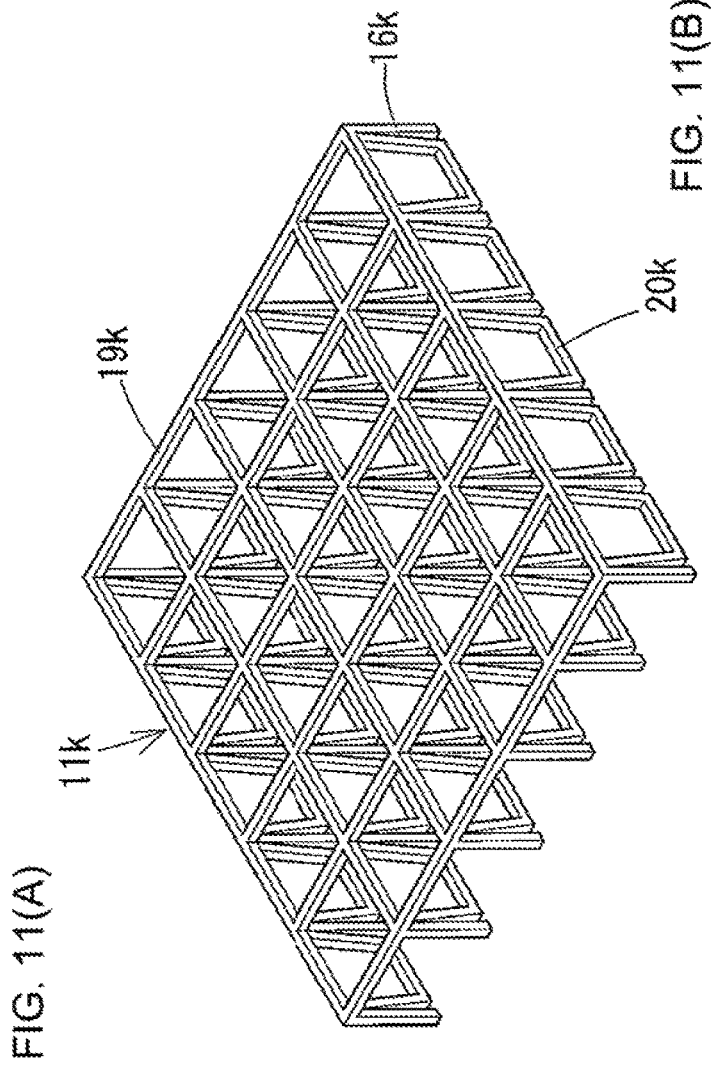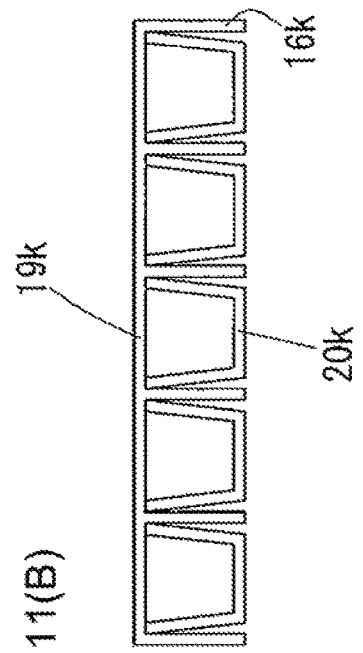

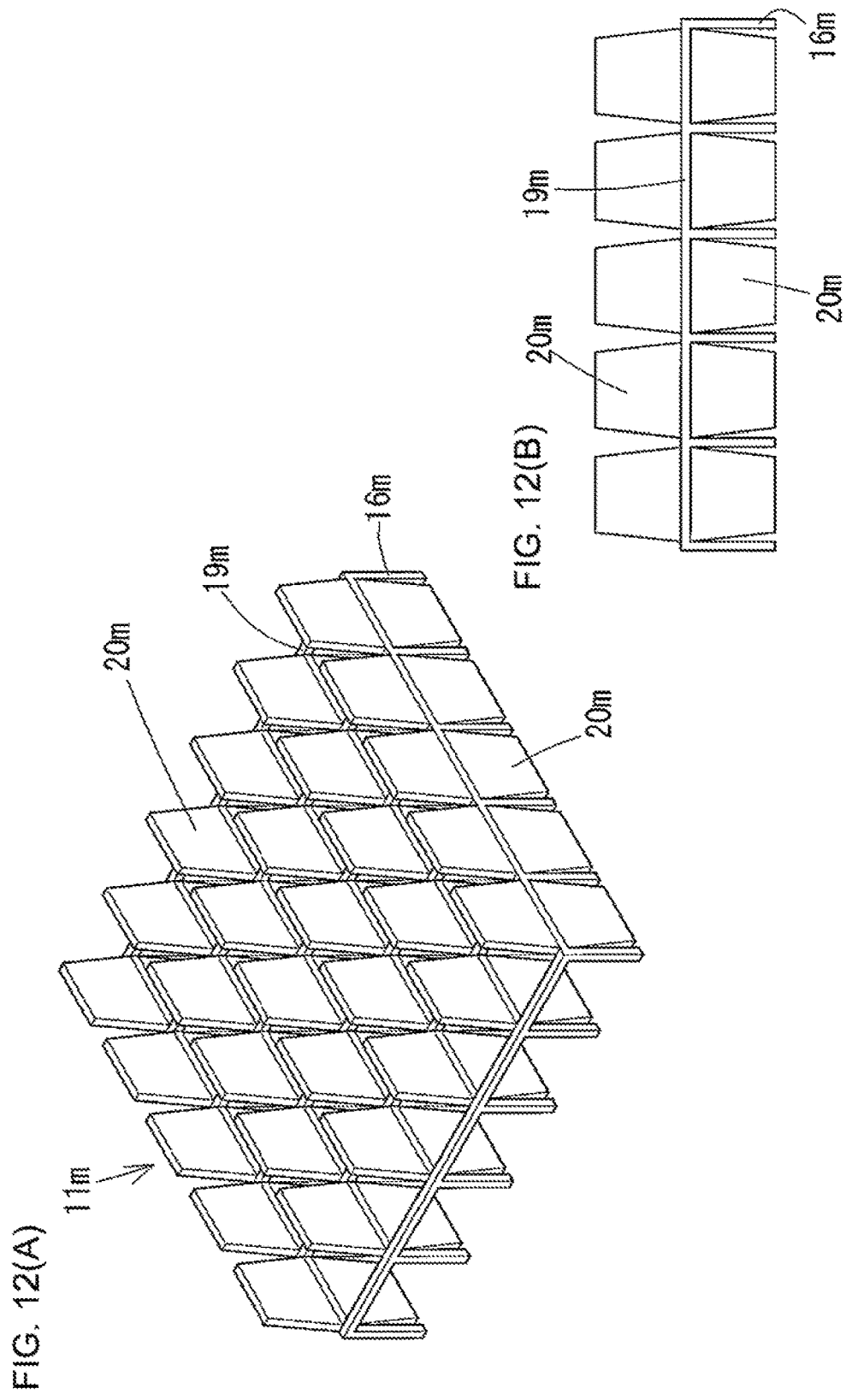

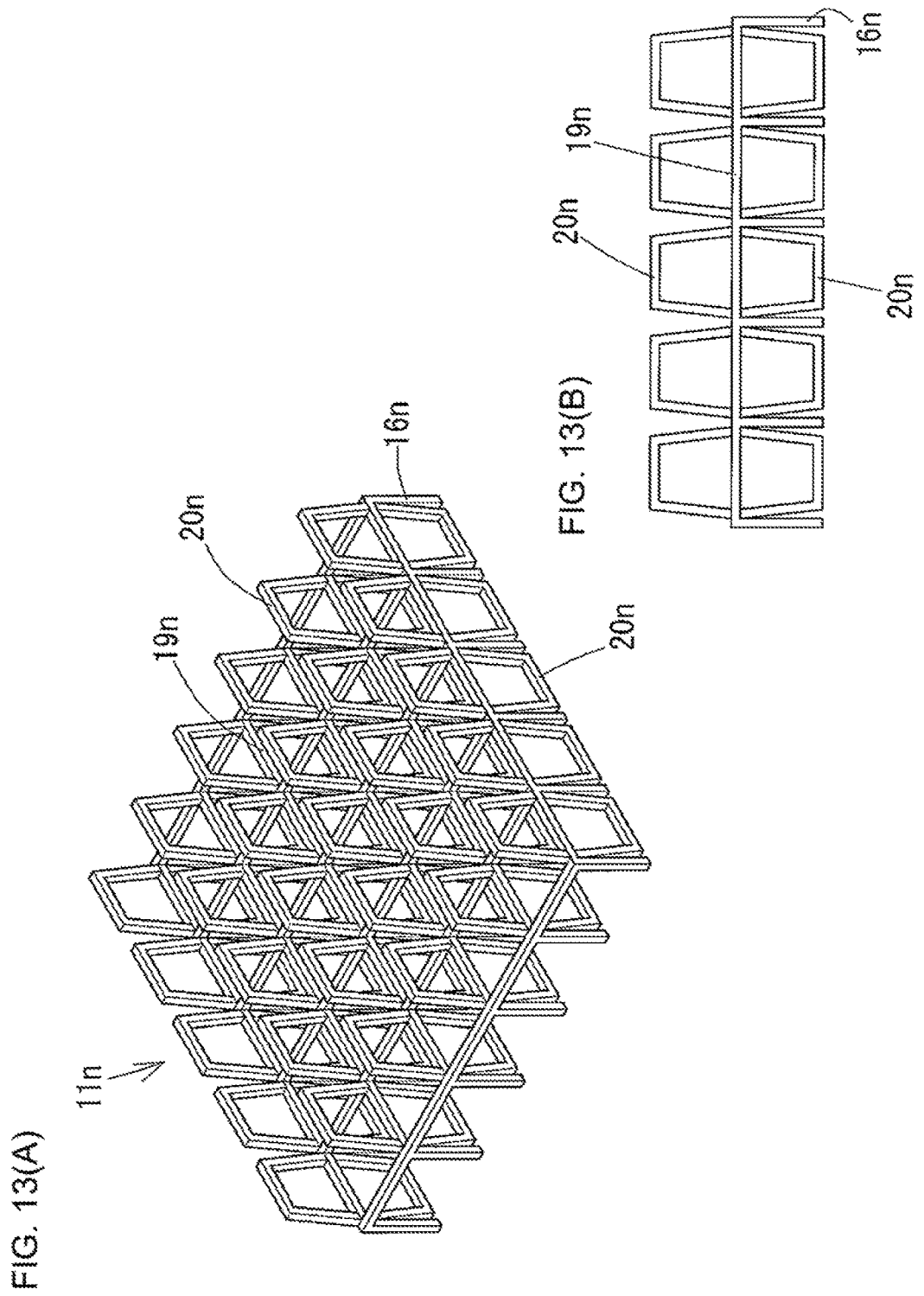

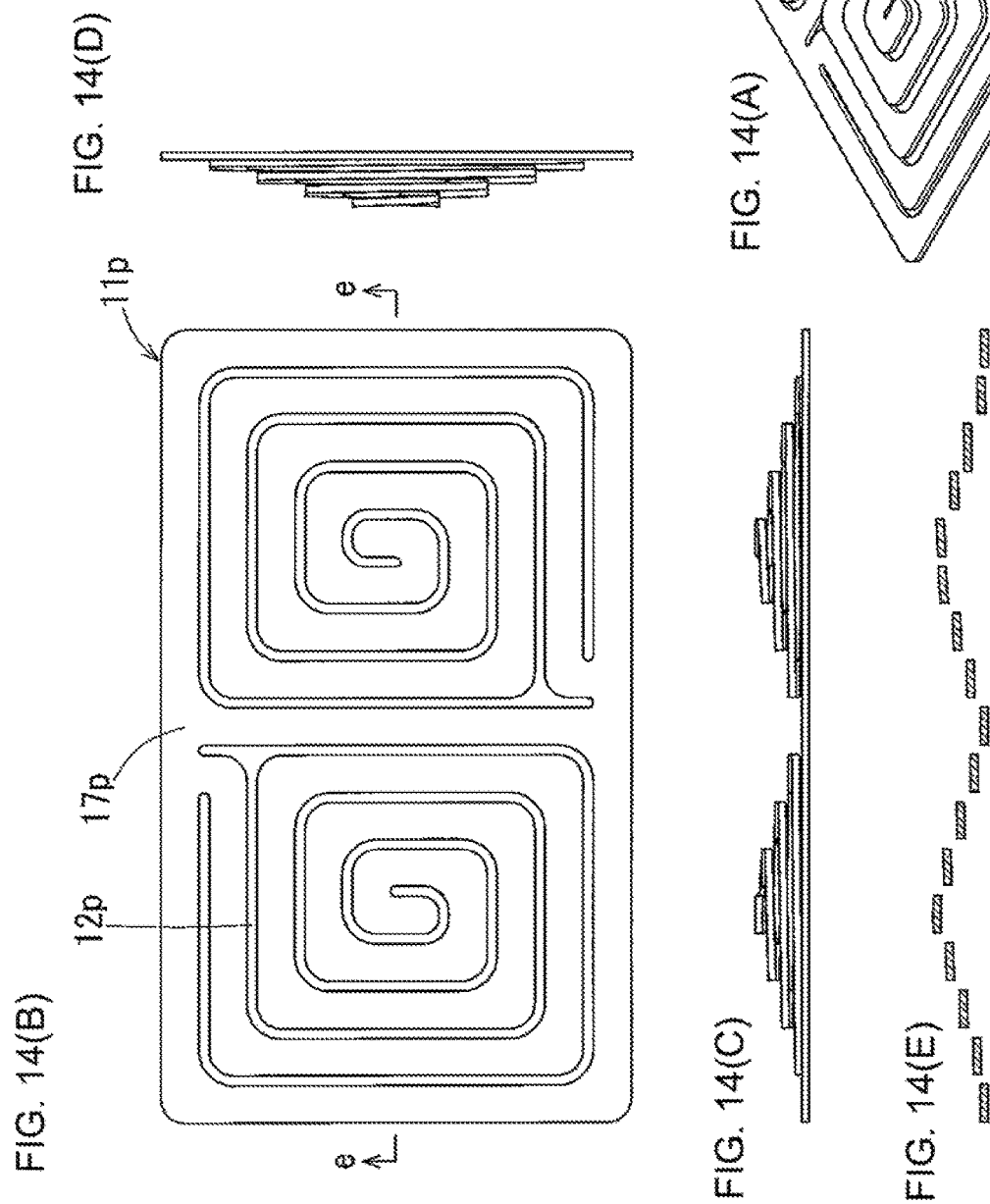

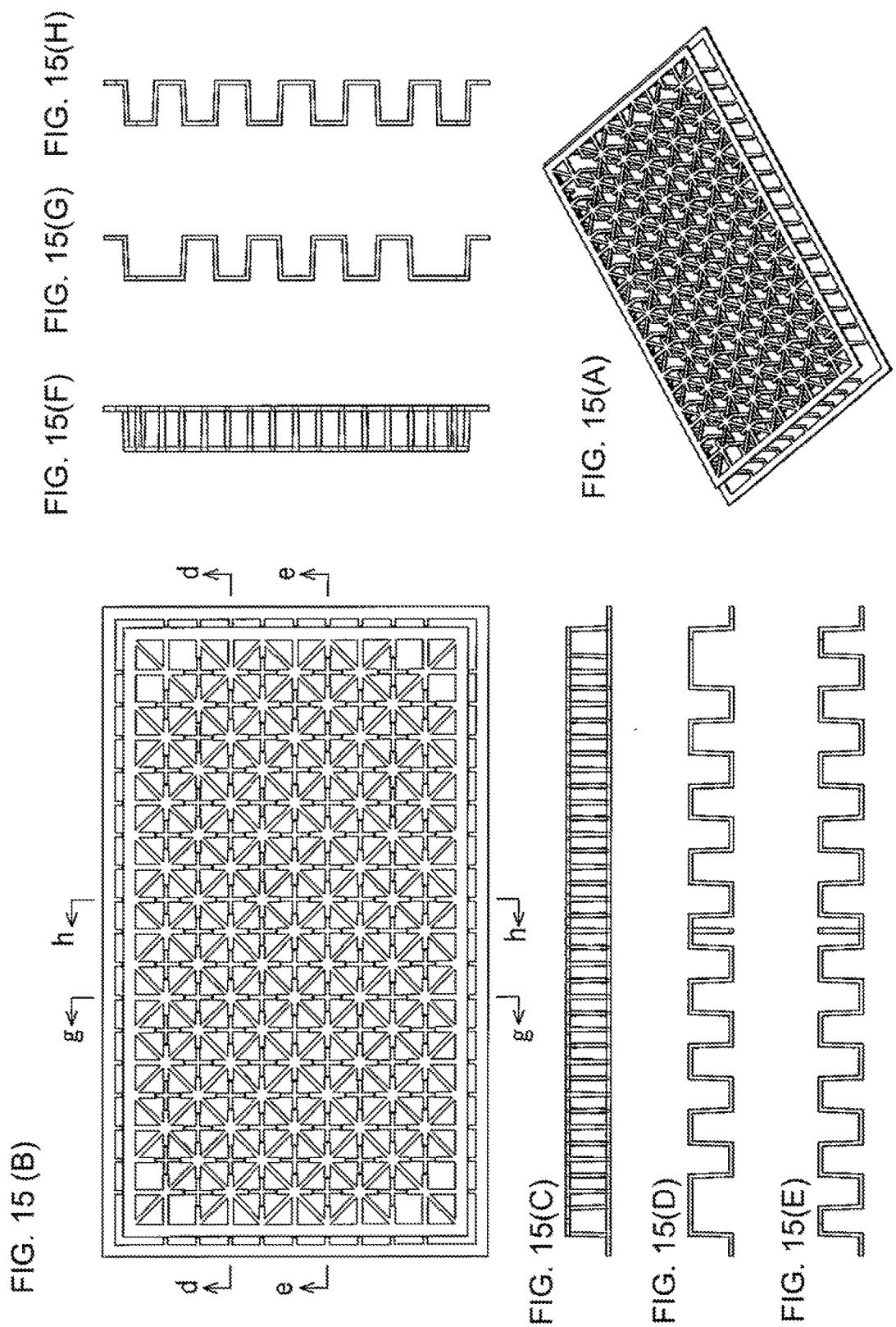

THREE-DIMENSIONAL STRUCTURE CONTAINING VOLATILE CHEMICAL

TECHNICAL FIELD

The present invention relates to a three-dimensional structure containing a volatile chemical.

BACKGROUND ART

Insect pests enter a house through its windows, front door and the like. For the prevention of such entry of insect pests into a house, one may consider setting up insect repellent devices at these entry points.

Such insect repellent devices include those prepared by incorporating a volatile insecticide into a net and storing the net in a container having an open window and those prepared by fitting a volatile chemical-containing net into a frame member (see Patent Document 1).

PRIOR ART DOCUMENT(S)

Patent Document(s)

Patent Document 1: JP 2006-314284 A

SUMMARY OF THE INVENTION

Problems to be Solved by the Invention

Such insect repellent devices are often used hung near a window, front door or the like and could thus be a nuisance or eyesore. As a countermeasure, one may consider making the insect repellent devices less conspicuous by reducing their overall size or thickness.

However, in order to reduce the overall size or thickness of such insect repellent devices, it is required to make the insecticide-containing net therein smaller, and this leads to a reduction in the amount of the insecticide volatilizing therefrom, consequently impairing the insect-repelling effect.

When a volatile chemical-containing net is used in a container, since the volatile chemical volatilizes from the surface of the net, if a large portion of the surface area of the net comes into contact with the inner wall of the container, volatilization of the volatile chemical may be interfered to reduce the amount of volatilized chemical and the volatile chemical adhering to the inner wall can contaminate the container.

Such problems of reduction in volatilization amount and contamination could also occur when a volatile chemical other than an insecticide, such as a repellent, an aromatic or an antimicrobial chemical, is used.

In view of the above, an object of the present invention is to provide a volatile chemical-containing structure in which not only a reduction in the amount of volatile chemical volatilizing therefrom is suppressed by securing a sufficient surface area even when the overall size of the structure is reduced but also the surface area of the entire structure that potentially comes into contact with the inner wall of a container is minimized as much as possible, whereby volatilization of the volatile chemical is not interfered and contamination of the container is inhibited.

Means for Solving the Problems

The present invention solves the above-described problems by providing a volatile chemical-containing three-dimensional structure obtained by molding a resin composition containing a volatile chemical into a plate form, wherein the three-dimensional structure has through-holes penetrating therethrough from a front to a back thereof, the through-holes have peripheries having a shape selected from polygonal, circular, circular arc and spiral shapes when the three-dimensional structure is viewed from the front, and the peripheries of the through-holes are formed on a single plane or on a smoothly curved imaginary surface.

Effects of the Invention

The volatile chemical-containing three-dimensional structure according to the present invention has, because of its three-dimensional conformation, a larger surface area per unit area than a substantially planar net. Therefore, even when the overall size of the structure is reduced, a sufficient surface area from which the volatile chemical volatilizes can be secured, and this enables to maintain the amount of volatiling chemical.

In addition, since the volatile chemical-containing three-dimensional structure according to the present invention comprises through-holes penetrating therethrough from its front to back and is thus capable of orienting the flow of volatilized chemical in a certain direction to make an air flow more easily be generated, the chemical is focused in a desired direction at a high concentration and the insect-repelling effect can thereby be improved.

Furthermore, because of the three-dimensional conformation, the parts of the volatile chemical-containing three-dimensional structure that come into contact with a container can be reduced, so that a reduction in the amount of volatilizing chemical as well as contamination of the container, which are caused by contact between the structure and the inner wall of the container, can be inhibited.

BRIEF DESCRIPTION OF THE DRAWINGS

FIG. 1(A) is a perspective view of a three-dimensional structure embodying the present invention; FIGS. 1(B), (C) and (D) are a front view, a side view and an end view of the three-dimensional structure shown in FIG. 1(A), respectively; and FIGS. 1(E) and (F) are cross-sectional views taken along the lines e-e and f-f of FIG. 1(B), respectively.

FIG. 2(A) is a perspective view of another three-dimensional structure embodying the present invention; FIGS. 2(B), (C) and (D) are a front view, a side view and an end view of the three-dimensional structure shown in FIG. 2(A), respectively; and FIGS. 2(E) and (F) are cross-sectional views taken along the lines e-e and f-f of FIG. 2(B), respectively.

FIG. 3(A) is a perspective view of yet another three-dimensional structure embodying the present invention; FIGS. 3(B), (C) and (D) are a front view, a side view and an end view of the three-dimensional structure shown in FIG. 3(A), respectively; and FIGS. 3(E) and (F) are cross-sectional views taken along the lines e-e and f-f of FIG. 3(B), respectively.

FIG. 4(A) is a perspective view of another three-dimensional structure embodying the present invention; FIGS. 4(B), (C) and (D) are a front view, a side view and an end view of the three-dimensional structure shown in FIG. 4(A), respectively; and FIGS. 4(E), (F) and (G) are cross-sectional views taken along the lines e-e, f-f and g-g of FIG. 4(B), respectively.

FIG. 5(A) is a perspective view of yet another three-dimensional structure embodying the present invention;

FIGS. 5(B), (C) and (D) are a front view, a side view and an end view of the three-dimensional structure shown in FIG. 5(A), respectively; and FIG. 5(E) is a cross-sectional view taken along the line e-e of FIG. 5(B).

FIG. 6(A) is a perspective view showing yet another example of a three-dimensional structure; FIGS. 6(B), (C), (D) and (E) are a front view, a side view, an end view and a back view of the three-dimensional structure shown in FIG. 6(A), respectively; and FIGS. 6(F) and (G) are cross-sectional views of the three-dimensional structure shown in FIG. 6(B) that are taken along the lines f-f and g-g, respectively.

FIG. 7(A) is a perspective view of yet another three-dimensional structure embodying the present invention; FIGS. 7(B), (C), (D) and (E) are a front view, a side view, an end view and a back view of the three-dimensional structure shown in FIG. 7(A), respectively; and FIGS. 7(F) and (G) are cross-sectional views taken along the lines f-f and g-g of FIG. 7(B), respectively.

FIG. 8(A) is a perspective view of yet another three-dimensional structure embodying the present invention; FIGS. 8(B), (C), (D) and (E) are a front view, a side view, an end view and a back view of the three-dimensional structure shown in FIG. 8(A), respectively; and FIG. 8(F) is a cross-sectional view taken along the line f-f of FIG. 8(B).

FIG. 10(A) is a perspective view of yet another three-dimensional structure embodying the present invention; and FIG. 10(B) is a front view of the three-dimensional structure shown in FIG. 10(A).

FIG. 11(A) is a perspective view of yet another three-dimensional structure embodying the present invention; and FIG. 11(B) is a front view of the three-dimensional structure shown in FIG. 11(A).

FIG. 12(A) is a perspective view of yet another three-dimensional structure embodying the present invention; and FIG. 12(B) is a front view of the three-dimensional structure shown in FIG. 12(A).

FIG. 13(A) is a perspective view of yet another three-dimensional structure embodying the present invention; and FIG. 13(B) is a front view of the three-dimensional structure shown in FIG. 13(A).

FIG. 14(A) is a perspective view of yet another three-dimensional structure embodying the present invention; FIGS. 14(B), (C) and (D) are a front view, a side view and an end view of the three-dimensional structure shown in FIG. 14(A), respectively; and FIG. 14(E) is a cross-sectional view taken along the line e-e of FIG. 14(B).

FIG. 15(A) is a perspective view of a three-dimensional structure used in Reference Example 1; FIGS. 15(B), (C) and (F) are a front view, a side view and an end view of the three-dimensional structure shown in FIG. 15(A), respectively; and FIGS. 15(D), (E), (G) and (H) are cross-sectional views taken along the lines d-d, e-e, g-g and h-h of FIG. 15(B), respectively.

MODE FOR CARRYING OUT THE INVENTION

Figure 9E:
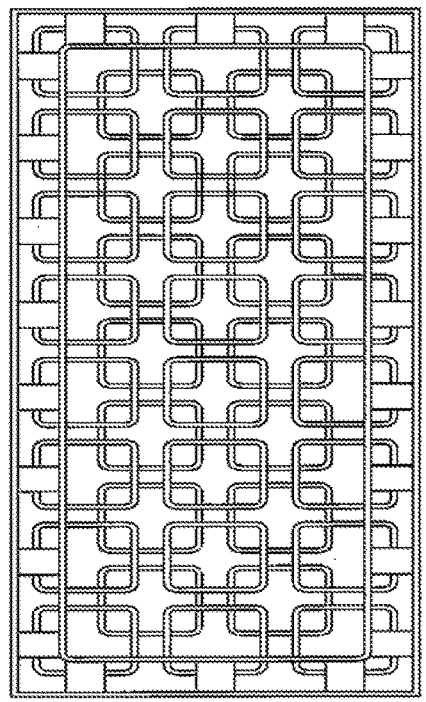
FIG. 9(A) is a perspective view of yet another three-dimensional structure embodying the present invention.
FIGS. 9(B), (C), (D) and (E) are a front view, a side view, an end view and a back view of the three-dimensional structure shown in FIG. 9(A), respectively.
FIGS. 9(F) and (G) are cross-sectional views taken along the lines f-f and g-g of FIG. 9(B), respectively.

The volatile chemical-containing three-dimensional structure according to the present invention is obtained by molding a resin composition containing a volatile chemical into a plate form.

[Volatile Chemical]

The volatile chemical is not particularly restricted as long as it is an chemical which is volatile at room temperature and whose active ingredient is volatile at normal temperature, and the volatile chemical may be, for example, an insecticide, a repellent, an aromatic, a deodorant, an antifungal chemical or an antimicrobial chemical.

Insecticides usable in the present invention include pyrethroid insecticidal components such as transfluthrin, metofluthrin, empenthrin, profluthrin, allethrin, flumethrin, prallethrin, resmethrin, phthalthrin, phenothrin and natural pyrethrin; organophosphorus insecticidal components such as dichlorvos, fenitrothion and malathion; and insect growth regulators such as methoprene and hydroprene. Among them, a pyrethroid insecticidal component selected from transfluthrin, metofluthrin, empenthrin and profluthrin is preferably used. Some of these compounds may include optical or geometric isomers based on an asymmetric carbon or unsaturated bond, and it is needless to say that the present invention also encompasses all of these individual isomers as well as any mixture thereof.

Repellents usable in the present invention include N,N-diethyl toluamide (DEET), dimethyl phthalate, dibutyl phthalate, 2-ethyl-hexandiol, dibutyl succinate and p-menthane-3,8-diol.

Aromatics usable in the present invention include citronella oil, orange oil, lemon oil, lime oil, "yuzu" (Japanese citron) oil, lavender oil, peppermint oil, *eucalyptus* oil, jasmine oil, "hinoki" (Japanese cypress) oil, green tea essential oil, limonene, α-pinene, linalool, geraniol, phenylethyl alcohol, amylcinnanic aldehyde and benzyl acetate.

Deodorants usable in the present invention include volatile deodorants such as cedar oil, "hinoki" (Japanese cypress) oil, bamboo extract, Japanese mugwort extract, tung oil, and pyruvic acid esters such as ethyl pyruvate and phenylethyl pyruvate.

Antifungal chemicals usable in the present invention include 2-n-octyl-4-isothiazolin-3-one, isopropylmethylphenol and o-phenylphenol.

Antimicrobial chemicals usable in the present invention include hinokitiol, tetrahydrolinalool, eugenol, citronellal and allyl isothiocyanate.

[Resin Composition]

The resin composition constituting the above-described three-dimensional structure will now be described.

The resin composition is prepared by incorporating a volatile chemical into a resin and capable of allowing the volatile chemical to volatilize therefrom.

The resin is not particularly restricted as long as it is capable of allowing the volatile chemical contained therein to gradually volatilize from the surface when the resin is used as is or in combination with the below-described carrier. Resins usable in the present invention include polyolefin-based resins, such as polyethylenes (PE) (e.g., branched low density polyethylenes (LDPE) and linear low-density polyethylenes (LLDPE)) and polypropylenes (PP); and polyolefin copolymers formed by one of these resins and a carboxylic acid ester (e.g., vinyl acetate, methyl methacrylate or ethyl methacrylate). A carboxylic acid ester is effective in controlling the volatilization of the volatile chemical from the resin surface. Generally speaking, the higher the content ratio of the carboxylic acid ester with respect to the polyolefin-based resin, the slower the bleeding rate of the volatile chemical tends to be. In the present invention, for example, an ethylene-vinyl acetate copolymer (EVA) or an ethylene-methyl methacrylate copolymer (EMMA) which contains a carboxylic acid ester in an amount of 1 to 35% by weight with respect to a polyolefin-based resin is preferably used.

Further, a polymer blend obtained by mixing a polyolefin copolymer and an olefin homopolymer at an adjusted ratio can also be used, and other polymeric compound(s) such as a styrene-based elastomer may also be incorporated as required.

It is noted here that the term "carboxylic acid ester" used above refers to an unsaturated carboxylic acid ester or vinyl carboxylate.

If necessary, a carrier such as talc, alumina, silica or white carbon may be used in combination with the resin composition, and a colorant, a stabilizer, an antistatic chemical and the like may further be incorporated as appropriate. The use of a carrier conveniently makes it possible to employ a production process that comprises a first step of preparing a masterbatch by incorporating a volatile chemical into a resin at a high concentration, and a second step of diluting the resulting masterbatch to a prescribed concentration by further adding a resin. The use of a carrier may also lead to the generation of air bubbles that are continuous from inside the resin composition to the surface, making the volatile chemical contained inside more easily bleed out to the surface.

The content of the volatile chemical in the resin composition is determined based on the type of the volatile chemical, the type of the resin, the use environment, the duration of the use, and the like. The longer the duration of the use, the higher the content of the volatile chemical has to be. Taking this into consideration, it is appropriate to set the content of the volatile chemical in a range of 1 to 20% by weight. If the content of the volatile chemical is less than 1% by weight, such content is insufficient for the volatile chemical to reveal its expected effects, whereas a content of higher than 20% by weight makes it difficult to mold the resin composition after kneading the volatile chemical thereinto, and may cause excessive bleeding of the volatile chemical on the resin surface, which is likely to result in stickiness.

If such a carrier is used, the carrier is incorporated into the resin composition in an amount of preferably not less than 5 parts by weight, more preferably not less than 10 parts by weight, with respect to 100 parts by weight of the volatile chemical. If the amount of the carrier is less than 5 parts by weight, the performance of the resin composition to retain the volatile chemical is poor and this makes it difficult to produce a three-dimensional structure from a masterbatch of the resin composition. As for the upper limit of the amount of the carrier to be used, the carrier is used in an amount of not greater than 50 parts by weight, preferably not greater than 35 to 40 parts by weight or so, with respect to 100 parts by weight of the volatile chemical. At an amount of greater than 50 parts by weight, the carrier may affect the strength of the resulting three-dimensional structure as well as bleeding of the volatile chemical.

The volatile chemical-containing three-dimensional structure according to the present invention can be produced by, for example, injection molding of the above-described resin composition. The injection molding can be performed under well-known conditions taking into consideration the type of the resin used, the content ratios of the respective components, and the like.

Since the volatile chemical contained in the resin composition bleeds out to the surface of the volatile chemical-containing three-dimensional structure and volatilizes therefrom, if a person touches the volatile chemical-containing three-dimensional structure, the volatile chemical may adhere to his/her hand. Therefore, it is preferred that the volatile chemical-containing three-dimensional structure according to the present invention be placed in a container for use. The container is not particularly restricted as long as it adequately prevents the volatile chemical-containing three-dimensional structure placed therein from coming into contact with human hands and has a hole (open window) of such a size that allows the volatile chemical to easily volatilize therethrough. In addition, depending on the intended use of the three-dimensional structure, the container is preferably configured such that it can be suspended or pasted to a window screen or the like.

The volatile chemical-containing three-dimensional structure according to the present invention is also advantageous in that it is more rigid than a net-form structure and that it can be smoothly placed in a container during the production process.

[Three-Dimensional Structure]

A three-dimensional structure obtained by molding the above-described resin composition will now be described.

This three-dimensional structure is molded into a plate form and has through-holes penetrating through the three-dimensional structure from the front to the back thereof. By the through-holes, not only the surface area of the three-dimensional structure is increased and the amount of the volatilizing chemical can thus be increased, but also the flow of the volatilized chemical is oriented in a certain direction to make an air flow more easily generated, so that the chemical can be focused in a desired direction at a high concentration and the insect-repelling effect can thereby be improved.

When the three-dimensional structure is viewed from the front, the through-holes have peripheries in the shape of, for example, a polygon such as a triangle, a quadrilateral, a pentagon, a hexagon or an octagon, a circle such as a true circle or an ellipse, a circular arc, or a spiral. The peripheries of the through-holes have end edges on each side which are on a single plane or on a smoothly curved imaginary surface. This configuration enables the three-dimensional structure to simultaneously exhibit the characteristic features of good design, ease of molding and increased volatilization of the volatile chemical.

From the standpoint of, for example, increasing volatilization of the volatile chemical, it is preferred that the through-holes be arranged in such a manner that the three-dimensional structure has a concealment ratio within a prescribed range when viewed from the front and a side. When viewed from the front, the three-dimensional structure has a concealment ratio of preferably not less than 5%, more preferably not less than 10%. At a concealment ratio of less than 5%, not only is it difficult to form the three-dimensional structure is difficult, but also the strength of the structure itself may be impaired. The upper limit of the concealment ratio when viewed from the front is preferably 50%, more preferably 40%. A concealment ratio of higher than 50% potentially makes it difficult to orient the flow of the chemical in a certain direction.

When viewed from a side, the three-dimensional structure has a concealment ratio of preferably not less than 50%, more preferably not less than 80%. If this concealment ratio is less than 50%, it could become difficult to orient the flow of the chemical in a certain direction. Meanwhile, since the three-dimensional structure is not required to have a through-hole across the side, the upper limit of the concealment ratio when viewed from a side is 100%.

Figure 9D:
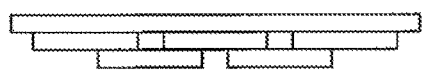
Figure 9B:
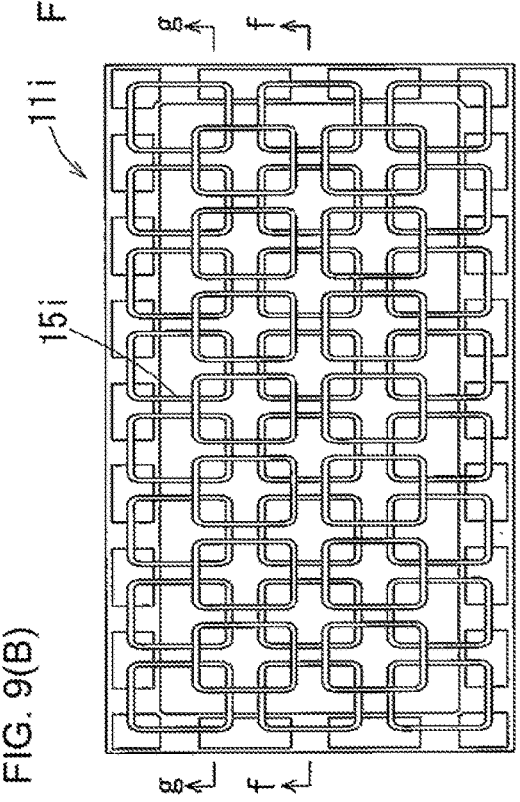
Figure 9A:
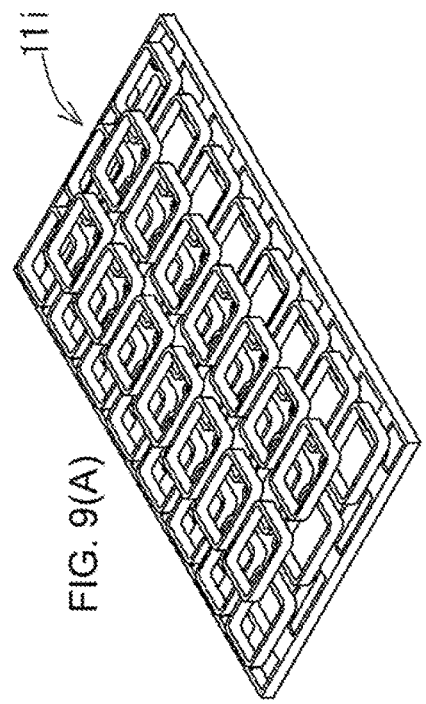
Figure 9C:
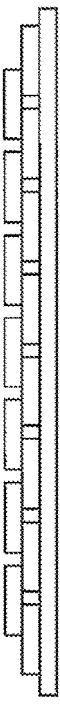
Figure 9F:
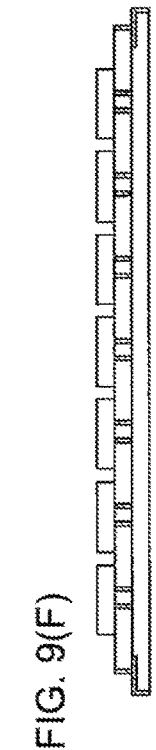
Figure 9G:
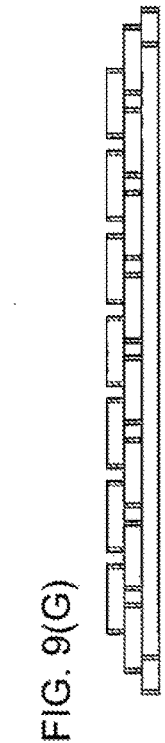

Specific three-dimensional structures of the above-described type are shown in FIGS. 1 to 14.

The peripheries of the above-mentioned through-holes are identical in shape to each other. According to the shape of the peripheries of these through-holes, additional through-holes having peripheries which are different in shape from those of the first-mentioned through-holes may form between adjacent ones of the first-mentioned through-holes or between the peripheral edge of the three-dimensional structure and corresponding ones of the first-mentioned through holes. This is because, depending on the shape of the peripheries of the first-mentioned through-holes, the front plane of the three-dimensional structure cannot be entirely occupied by the first-mentioned through-holes, leaving unoccupied parts. The shape of the unoccupied parts is not specifically described below; however, the presence or absence thereof can be determined from each drawing or the like.

First, in three-dimensional structures 11a to 11e shown in FIGS. 1 to 5, respectively, the peripheries 13a to 13e of the through-holes 12a to 12e are each constant in shape from the front to the back of the three-dimensional structures 11a to 11e. Flat plates extending in the thickness direction constitute both the peripheral edges 14a to 14e of the respective three-dimensional structures and the peripheries 13a to 13e of the through-holes 12a to 12e. From the standpoint of making the flow of the chemical more easily be oriented in a certain direction, it is preferred that the three-dimensional structures 11a to 11e have such a thickness that allows each structure to be self-standing (a thickness that enables each structure to stand without any support) when each structure is set with its surface in the thickness direction on the bottom.

In the drawings of FIGS. 1 to 5, the peripheries 13a to 13e of the through-holes 12a to 12e have an equilateral triangular shape (FIG. 1), a square shape (FIG. 2), a regular hexagonal shape (FIG. 3), a true circular shape (FIG. 4), and a plurality of different triangular shapes (FIG. 5), respectively.

A three-dimensional structure 11f shown in FIG. 6 includes a plurality of through hole-forming parts 15f corresponding in shape to the through-holes 12f (the peripheries 13f of the through-holes to be more exact). The through hole-forming parts 15f are formed from rod-like members made of the above-described resin composition, by e.g., bending. The through hole-forming parts 15f are coupled together on a single plane to constitute the front surface portion of the three-dimensional structure 11f. This three-dimensional structure 11 further includes rod-like members connected to the through hole-forming parts 15f to form a large number of legs 16f that 1 constitute the back surface portion of the three-dimensional structure 11f. Accordingly, the three-dimensional structure shown in FIG. 6 is in the form of a plate as a whole.

In the drawings of FIG. 6, the through-holes 12f (the peripheries 13f thereof), that is, the through hole-forming parts 15f, are exemplified to have a square shape.

Three-dimensional structures 11g and 11h shown in FIGS. 7 and 8 each include a plate member 17g (17h) formed with circular or polygonal holes, and cover parts 18g (18h) arranged on one or both sides of the plate member 17g (17h) to cover the holes. Accordingly, the three-dimensional structures shown in FIGS. 7 and 8 are both in the form of a plate as a whole. Each cover part 18g (18h) constitutes a surface protruding from the plate member 17g (17h) and has such a shape that allows the protruding surfaces to overlap with each other when a plurality of the respective plate members are stacked together.

The cover parts 18g and 18h are hollow parts that have, for example, a hemispherical or dome shape created by cutting a spherical or ellipsoidal object; a columnar shape such as the shape of a triangular prism, a quadrangular prism, a hexagonal prism or the like; a pyramidal or conical shape such as the shape of a triangular pyramid, a quadrangular pyramid, a hexagonal pyramid or the like; or a pyramidal or conical frustum shape such as the shape of a triangular frustum, a quadrangular frustum, a hexagonal frustum or the like. The bottom of each cover part is open, and the inside of each cover part and its corresponding hole of each plate material are in communication with each other.

The through-holes 12g (12h) are formed in the cover parts or in the plate member at its portions where the above-mentioned circular or polygonal holes are not formed. Examples of the shape of these through-holes include a linear shape in addition to the above-described shapes.

In the each of the embodiments of FIGS. 7 to 8, the holes of the plate member have a true circular shape, and the cover parts have a true hemispherical shape (FIG. 7) or a conical frustum shape (FIG. 8). The through-holes have circular arc, true circular or linear shapes (FIG. 7), or a true circular shape (FIG. 8).

A three-dimensional structure 11i shown in FIG. 9 comprises through hole-forming parts 15i corresponding in shape to the through-holes (that is, to the peripheries of the through-holes) and can be formed from rod-like members made of the above-described resin composition, by e.g., bending. The through hole-forming parts 15i may be arranged in a single layer or in a plurality of layers superimposed on one another, and these through hole-forming parts 15i are coupled together directly or via coupling members.

When the through hole-forming parts 15i are provided in a plurality of layers that are superimposed on one another, the edges of some of the through hole-forming parts 15i that form the layers other than the topmost layers are arranged beneath the holes of the through hole-forming parts 15i forming the topmost layer; however, this presents nothing more than partial blockage of the holes.

In the drawings of FIG. 9, the through-holes (the peripheries thereof), that is, the through hole-forming parts 15i, are exemplified to have a rectangular shape.

In three-dimensional structures 11j, 11k, 11m and 11n shown in FIGS. 10 to 13, respectively, at the intersections on one side of a lattice 19j, 19k, 19m or 19n having a structure in which a plurality of rod-like members crisscross with each other in a lattice form, legs 16j, 16k, 16m or 16n each composed of a rod-like member are connected at a right angle with respect to the lattice. Further, on the above-described one side of the lattice, on the opposite side thereof or on both sides, projections 20j, 20k, 20m or 20n are formed along the rod-like members between adjacent intersections of the lattice.

These projections are in the form of rods or plates that are formed into a prescribed shape. Examples of the shape include polygonal shapes and those shapes that are created by cutting a part of a true circle or an ellipse.

FIGS. 10 and 11 exemplify the cases where the projections 20j (20k) are arranged the one side of the lattice, and FIGS. 12 and 13 exemplify the cases where the projections 20m (20n) are arranged on both sides of the lattice. In the drawings of FIGS. 10 and 12, the projections 20j and 20m are exemplified to have a trapezoidal plate shape, while in the drawings of FIGS. 11 and 13, the projections 20k and 20n are exemplified to have a trapezoidal outline formed by rod-like members.

While the projections 20m and 20n arranged on both sides in the drawings of FIGS. 12 and 13 are identical, they may be different from each other.

A three-dimensional structure 11p shown in FIG. 14 comprises a plate member 17p formed with spiral through-holes 12p having the central portions thereof lifted upward. Accordingly, the plate member 17p constitutes a surface with continuously changing height and the structure thus has a thickness as a three-dimensional structure.

The volatile chemical-containing three-dimensional structure according to the present invention can be produced by subjecting the above-described resin composition to, for example, a molding process such as injection molding, deformation, bending and/or joining. These processes can be performed under well-known conditions taking into consideration the type of the resin used, the content ratios of the respective components and the like.

Since the volatile chemical contained in the resin composition bleeds out to the surface of the volatile chemical-containing three-dimensional structure and volatilizes therefrom, if a person touches the volatile chemical-containing three-dimensional structure, the volatile chemical may adhere to his/her hand. Therefore, it is preferred that the volatile chemical-containing three-dimensional structure according to the present invention be placed in a container for use. The container is not particularly restricted as long as it adequately prevents the volatile chemical-containing three-dimensional structure placed therein from coming into contact with human hands and has a hole (open window) of such a size that allows the volatile chemical to easily volatilizes therethrough. In addition, depending on the intended use of the three-dimensional structure, the container is preferably configured such that it can be suspended or pasted to a window screen or the like.

The volatile chemical-containing three-dimensional structure according to the present invention is also advantageous in that it is more rigid than a net-form structure and that it can be smoothly placed in a container in the production process.

The volatile chemical-containing three-dimensional structure according to the present invention can be housed in a container and then hung, pasted to a window screen or the like, or set stationary so as to be used as, for example, an insecticide, an insect repellent, an aromatic or a deodorant, depending on the volatile chemical used therein.

EXAMPLES

The present invention will now be described more concretely by way of examples thereof. It is to be understood, however, that the present invention is not restricted to the below-described examples and encompasses any modification as long as it does not depart from the spirit of the present invention.

Example 1

The volatile chemical-containing three-dimensional structure shown in FIG. 5 was subjected to the following experiment.

First, a masterbatch in the form of pellets was produced by kneading 50 parts by weight of transfluthrin (manufactured by Sumitomo Chemical Co., Ltd.) as a volatile chemical, 18 parts by weight of white carbon (Carplex #80, manufactured by Evonik Industries AG; average particle size=15 μm), 20 parts by weight of an ethylene-vinyl acetate copolymer (Ultrasen 710, manufactured by Tosoh Corporation; vinyl acetate content in the copolymer=28%) and 12 parts by weight of LDPE (Suntec LDM6520, manufactured by Asahi Kasei Corporation) at 120 to 140° C.

Then, 100 parts by weight of the thus obtained pellets was kneaded with 300 parts by weight of the above-described LDPE at 120 to 140° C., and the resulting resin composition was subjected to injection molding, joining and the like to obtain the volatile chemical-containing three-dimensional structure (10 g) shown in FIG. 5.

This volatile chemical-containing three-dimensional structure was adjusted to have an overall size of 95 mm×160 mm×12 mm, and the surface area thereof was measured to be 90,800 $mm^2$.

The thus obtained volatile chemical-containing three-dimensional structure was hung in a room maintained at 25° C. with an air flow of 0.5 m/s, and the weight of the volatile chemical-containing three-dimensional structure was measured with time to determine the amount of volatilized volatile chemical and the duration of volatilization.

As a result, it was found that volatilization lasted for about 200 days and the average volatilization rate over the entirety of this period was 5.8 mg/day.

Comparative Example 1

A tubular net with a rhombic mesh pattern (4.8 g) was prepared by injection molding the resin composition obtained in Example 1. The net was composed of threads of 0.7 mm in outer diameter and had a mesh size of 4 mm×4 mm. This volatile chemical-containing three-dimensional structure (tubular net) had an overall size of about twice the size of the three-dimensional structure of Example 1 at 80 mm×150 mm when pressed flat (which corresponds to an area of 160 mm×150 mm when the tubular net is cut and spread open), and the surface area thereof was measured to be 20,400 $mm^2$.

For the thus obtained net, the amount of volatilized volatile chemical and the duration of volatilization were determined in the same manner as in Example 1.

As a result, although volatilization was found to last for about 200 days, the average volatilization rate over the entirety of this period was mere 2.9 mg/day. Thus, in order to attain a volatilization rate that is equivalent to that of the volatile chemical-containing three-dimensional structure of the present invention, it is necessary to considerably increase the size and/or the weight of the net, and this is expected to accompany a difficulty in the product design.

(Results)

From the above, it was revealed that the volatilization rate of the volatile chemical-containing three-dimensional structure of Example 1 is about twice as high as that of Comparative Example 1, an increase of which is more pronounced than an increase expected from the difference in surface area between these volatile chemical-containing three-dimensional structures; and that, by reducing the parts of the respective structures that come into contact with the container, a reduction in the volatilization rate of the volatile chemical as well as contamination of the container, which are caused by contact between the structure and the inner wall of the container, can be inhibited.

Reference Example 1

A volatile chemical-containing three-dimensional structure was produced in the same manner as in Example 1, except that metofluthrin (Eminence, manufactured by Sumitomo Chemical Co., Ltd.) was used as the volatile chemical and the three-dimensional structure had the configuration shown in Japanese Patent No. 5547350 (FIG. 15).

The thus obtained volatile chemical-containing three-dimensional structure was hung in a room maintained at 25° C., and an air flow of 0.5 m/s was applied to the front or side of the volatile chemical-containing three-dimensional structure. The amount of volatilized volatile chemical in a 30-day period was determined based on the reduction in the weight of the volatile chemical-containing three-dimensional structure, and the amount of volatilization per unit time (mg/h, mg/day) was calculated. The results thereof are shown in Table 1.

Examples 2 to 11

Volatile chemical-containing three-dimensional structures were produced and the amount of volatilized volatile chemical (mg/h, mg/day) was determined in the same manner as in Reference Example 1, except that the three-dimensional structures each had the configurations shown in FIGS. 1 to 9 and FIG. 14. The results thereof are shown in Table 1.

TABLE 1

| | | Three-dimensional Structure | Surface to which air flow was applied | Concealment ratio (%) | Amount of volatilized metofluthrin in 30 days (mg/h) | (mg/day) |
|---|---|---|---|---|---|---|
| Reference Example | 1 | FIG. 15 | front | 81 | 0.10 | 2.40 |
| | | | side | 48 | 0.10 | 2.40 |
| | | | Average | | 0.10 | 2.40 |
| Example | 2 | FIG. 1 | front | 36 | 0.15 | 3.60 |
| | | | side | 100 | 0.07 | 1.68 |
| | | | Average | | 0.11 | 2.64 |
| | 3 | FIG. 2 | front | 23 | 0.16 | 3.84 |
| | | | side | 100 | 0.07 | 1.68 |
| | | | Average | | 0.12 | 2.76 |
| | 4 | FIG. 3 | front | 19 | 0.16 | 3.84 |
| | | | side | 100 | 0.07 | 1.68 |
| | | | Average | | 0.12 | 2.76 |
| | 5 | FIG. 4 | front | 23 | 0.16 | 3.84 |
| | | | side | 100 | 0.07 | 1.68 |
| | | | Average | | 0.12 | 2.76 |
| | 6 | FIG. 5 | front | 43 | 0.16 | 3.84 |
| | | | side | 100 | 0.07 | 1.68 |
| | | | Average | | 0.12 | 2.76 |
| | 7 | FIG. 6 | front | 50 | 0.13 | 3.12 |
| | | | side | 59 | 0.09 | 2.16 |
| | | | Average | | 0.11 | 2.64 |
| | 8 | FIG. 7 | front | 77 | 0.11 | 2.64 |
| | | | side | 58 | 0.09 | 2.16 |
| | | | Average | | 0.10 | 2.40 |
| | 9 | FIG. 8 | front | 97 | 0.12 | 2.88 |
| | | | side | 76 | 0.09 | 2.16 |
| | | | Average | | 0.11 | 2.52 |
| | 10 | FIG. 9 | front | 45 | 0.11 | 2.64 |
| | | | side | 89 | 0.10 | 2.40 |
| | | | Average | | 0.11 | 2.52 |
| | 11 | FIG. 14 | front | 85 | 0.14 | 3.36 |
| | | | side | 100 | 0.09 | 2.16 |
| | | | Average | | 0.12 | 2.76 |

[Results]

In all of Examples 2 to 11, as compared to Reference Example 1, the amount of volatilized chemical was greater when the air flow was applied to the front, although the amount of volatilized chemical was slightly less when the air flow was applied to the side. The average rate of volatilization from the side and that from the front were both equivalent between Reference Example 1 and Examples 2 to 11.

Therefore, it was found that the three-dimensional structures of Reference Example 1 and Examples 2 to 11 are all capable of exhibiting a sufficient amount of volatilization; and that the three-dimensional structures of Examples 2 to 11 are capable of focusing the chemical in a desired direction at a high concentration. Accordingly, these three-dimensional structures are expected to show an improved insect-repelling effect at places of interest.

DESCRIPTION OF SYMBOLS

11$a$ to 11$k$, 11$m$, 11$n$, 11$p$: Three-dimensional structure
12$a$ to 12$h$, 12$p$: Through-hole
13$a$ to 13$f$: Periphery of through-hole
14$a$ to 14$e$: Peripheral edge
15$f$, 15$i$: Through hole-forming part
16$f$, 16$j$, 16$k$, 16$m$, 16$n$: Leg
17$g$, 17$h$, 17$p$: Plate material
18$g$, 18$h$: Cover part
19$j$, 19$k$, 19$m$, 19$n$: Lattice
20$j$, 20$k$, 20$m$, 20$n$: Projection

The invention claimed is:

1. A volatile chemical-containing three-dimensional structure obtained by molding a resin composition comprising a volatile chemical into a plate form, wherein
the three-dimensional structure has through-holes penetrating therethrough from a front to a back thereof,
the through-holes have peripheries having a spiral shape when the three-dimensional structure is viewed from the front, wherein the spiral shape is a spiral defined by the periphery of each through-hole shaped so that a front surface of a plate member rises continuously to the center of the spiral and the center is the highest level of the spiral,
the peripheries of the through-holes are formed on a single plane or on a smoothly curved imaginary surface,
the volatile chemical is metofluthrin and the content of the metofluthrin is in a range of 1 to 20% by weight of the resin composition, and
the three-dimensional structure is configured such that a ratio of a first volatilization amount to a second volatilization amount is 1.56,
wherein the first volatilization amount is an amount of a portion of the metofluthrin that is volatilized when the three-dimensional structure is placed in an environment of 25° C., and an air flow is applied to a front of the three-dimensional structure at an air flow rate of 0.5 m/s for a period of 30 days, and the second volatilization amount is an amount of a portion of the metofluthrin that is volatilized when the three-dimensional structure is placed in an environment of 25° C., and an air flow is applied to a side of the three-dimensional structure at an air flow rate of 0.5 m/s for a period of 30 days.

2. The volatile chemical-containing three-dimensional structure according to claim 1, wherein
the shape of the peripheries of the through-holes is constant when viewed from the front to the back, and
the three-dimensional structure is self-standing.

3. The volatile chemical-containing three-dimensional structure according to claim 1, which has a concealment ratio of 5% to 50% when viewed from the front and 50% to 100% when viewed from a side.

4. The volatile chemical-containing three-dimensional structure according to claim 2, which has a concealment ratio of 5% to 50% when viewed from the front and 50% to 100% when viewed from a side.

\* \* \* \* \*